UNITED STATES PATENT OFFICE.

THEODOR MAYER, OF FEUERBACH, GERMANY.

ANTIMONY COMPOUND AND PROCESS OF MAKING SAME.

SPECIFICATION forming part of Letters Patent No. 509,478, dated November 28, 1893.

Application filed October 14, 1892. Serial No. 448,901. (Specimens.)

*To all whom it may concern:*

Be it known that I, THEODOR MAYER, a subject of the King of Würtemberg, residing at Feuerbach, Würtemberg, Germany, have invented a new and useful Improvement in the Art of Obtaining Compounds of Antimonious Fluoride, of which the following is a specification.

The present invention relates to the art of obtaining compounds of antimonious fluorid and particularly the production of compounds of antimonious fluorid in combination with alkali salts.

The methods hitherto employed for producing double salts of antimonious fluorid with alkali-sulfates result in compounds containing one molecule of antimonious fluorid combined with one molecule of the alkali-salt. The only exception is the salt having the formula $2SbF_3.1\frac{1}{2}Am_2SO_4$, set forth in German Patent No. 57,615.

The object of the present invention, however, is to obtain compounds corresponding to the type $2SbF_3.M_2SO_4$ (wherein M designates one of the alkali-metals, potassium, sodium or ammonium).

With this object in view, my invention consists in the method, steps and features hereinafter set forth and pointed out in the claims.

Under the said invention antimonious fluorid and an alkali-sulfate are caused to react upon each other in such quantities that no more than one molecule of alkali-sulfate is added to each two molecules of antimonious fluorid ($SbF_3$). From this reaction, I obtain compounds having the formula $2SbF_3.M_2SO_4$, of marked characteristics, forming beautiful crystals, and which were hitherto entirely unknown and form a new class of double salts of antimony. The above reaction would be sufficient for most purposes, but the formation and crystallization of these new salts will be materially assisted by substituting a certain amount of hydrochloric acid for the hydrofluoric acid. If a certain limit is exceeded in the substitution of hydrochloric acid, the hydrochloric acid acts to decompose the sulfate and mixtures of the sulfate double-salts with the alkali-chlorid double-salts, of the formula $SbF_3.MCl$, or even the latter alone, may be produced. The technological or practical value of the beautifully crystallizing compounds of two molecules of antimonious fluorid ($SbF_3$) with one molecule alkali-sulfate is due to the fact that its percentage of antimony is considerably higher than that of all similar crystallic salts, and that, nevertheless, they are at least equal, if not superior, to the compounds having the formulæ $SbF_3.M_2SO_4$ and $SbF_3.MCl$ in stability and solubility. The price of the antimony in these novel salts is, moreover, manifestly correspondingly lower than in the other compounds, inasmuch as their percentage of indifferent substances is considerably less.

I have found that production of only the potassium and ammonium-sulfate double antimonious fluorid is technologically practicable. The process of obtaining these salts is the following: A quantity of oxid of antimony, corresponding to fully one molecule, is stirred with water, and fuming hydrofluoric acid (containing thirty-three per cent. hydrochloric acid and sixty-seven per cent. hydrofluoric acid) is then added until the oxid has been dissolved and a sample of the solution remains clear upon diluting with water. A quantity of the alkali-sulfate, corresponding to one molecule, is then added to the warmed solution while constantly stirring. The solution is then allowed to cool, whereupon the desired double salts crystallize from the same.

The potassium-sulfate-double-antimonious flourid ($2SbF_3.K_2SO_4$) separates from a solution free from hydrochloric acid in crusts and druses of prismatic or lanceolate crystals. Where the solution, however, contains hydrochloric acid, brilliant crystals of predominating prismatic formation are formed. The double salt is readily soluble in water, and is characterized by great stability. The analysis of this salt showed a composition appearing from the following table:

| Preparation I. | Computed for $2SbF_3.K_2SO_4$. |
|---|---|
| Sb ................ 45.7% | 45.8% |
| $K_2O$ ............... 17.4% | 17.6% |
| F ................ 22.0% | 21.6% |
| $SO_3$ ............... 15.1% | 15.0% |

The ammonium-sulfate-double antimonious fluorid ($2SbF_3.Am_2SO_4$) crystallizes in beautiful alum-like octahedrons from a solution containing hydrochloric acid. It also is readily soluble in water and mild in character. A remarkable fact connected therewith is that it is not isomorphous to the analogous potassium-salt. The analysis of this salt—which is easily rendered impure by small quantities of the compound $2SbF_3 \cdot 1\frac{1}{2} Am_2SO_4$—showed the composition given in the following table:

| Compound II. | $2SbF_3 \cdot Am_2SO_4$. | Computed for $2SbF_3 \cdot 1\frac{1}{2}Am_2SO_4$. |
|---|---|---|
| Sb .... 48.38% | 49.7% | 43.8% |
| $NH_3$... 6.75% | 6.9% | ...... |
| F ..... 24.15% | 23.4% | ...... |
| $H_2SO_4$ . 19.6% | 20.0% | ...... |

The sodium-sulfate-double antimonious fluorid ($2SbF_3 \cdot Na_2SO_4$) could not hitherto be obtained in crystals.

The above tables show that the new alkali-sulfate-double ammonious fluorids contain a quantity of antimony which exceeds that of the corresponding hitherto known salts having one molecule of $SbF_3$, by eleven per cent. in round numbers.

What I claim, and desire to secure by Letters Patent, is—

1. The process of obtaining a crystalline compound of antimonious fluorid and an alkaline sulfate, which consists in causing alkali sulfate to act upon antimonious fluorid in quantities of two molecules of the latter to one molecule of the former, substantially as set forth.

2. The process which consists in adding hydrofluoric acid to oxid of antimony until the latter is dissolved, and thereupon adding sulfate of an alkali-metal, the sulfate of alkali-metal being added in quantities of one molecule of the sulfate of the alkali-metal to two molecules of the antimonious fluorid formed substantially as set forth.

3. The process which consists in adding hydrofluoric acid with hydrochloric acid to oxid of antimony until the oxid is dissolved, then adding alkali-sulfate to the solution and stirring, the sulfate of alkali-metal being added in quantities of one molecule of the sulfate of the alkali-metal to two molecules of the antimonious fluorid formed substantially as set forth.

4. The process which consists in adding to oxid of antimony a mixture of thirty-three per cent. of hydrochloric acid with sixty-seven per cent. of hydrofluoric acid and stirring until the oxid has been dissolved, then adding alkali-sulfate to the warmed solution and stirring, the sulfate of alkali-metal being added in quantities of one molecule of the sulfate of the alkali-metal to two molecules of the antimonious fluorid formed, substantially as set forth.

5. The herein described compound, being alkali-sulfate double antimonious fluorid, having the formula $2SbF_3 \cdot M_2SO_4$ readily soluble in water and of great stability.

In testimony whereof I have signed this specification in the presence of two subscribing witnesses.

THEODOR MAYER.

Witnesses:
AUGUST B. DRANTZ,
CARL TASSMANNT.